United States Patent
Hatton et al.

(10) Patent No.: US 10,688,963 B2
(45) Date of Patent: Jun. 23, 2020

(54) VEHICLE WITH EXTENDED RANGE REMOTE CONTROL KEY FOB

(71) Applicant: FORD GLOBAL TECHNOLOGIES, LLC, Dearborn, MI (US)

(72) Inventors: David Anthony Hatton, Orchard Lake, MI (US); David Marvin Gersabeck, Commerce Township, MI (US); Thomas Nelson, Plymouth, MI (US); Michael Andrew Simons, Redford Township, MI (US); Ziad Alhihi, Dearborn, MI (US); Ryan Conroy, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 15/812,759

(22) Filed: Nov. 14, 2017

(65) Prior Publication Data
US 2019/0143937 A1     May 16, 2019

(51) Int. Cl.
*B60R 25/00*    (2013.01)
*B60R 25/24*    (2013.01)
*B60R 25/20*    (2013.01)

(52) U.S. Cl.
CPC ............ *B60R 25/24* (2013.01); *B60R 25/209* (2013.01); *B60R 2325/205* (2013.01)

(58) Field of Classification Search
USPC .......................................................... 701/2
See application file for complete search history.

(56) References Cited

U.S. PATENT DOCUMENTS

| | | |
|---|---|---|
| 7,821,383 B2 | 10/2010 | Sultan et al. |
| 8,751,065 B1 | 6/2014 | Kato |
| 9,544,853 B1 | 1/2017 | Gu et al. |
| 2014/0176301 A1 | 6/2014 | Fernandez Banares et al. |
| 2014/0237229 A1 | 8/2014 | Rosenblatt |
| 2018/0326947 A1* | 11/2018 | Oesterling ............ B60R 25/241 |

* cited by examiner

*Primary Examiner* — James M McPherson
(74) *Attorney, Agent, or Firm* — Michael Spenner; Brooks Kushman PC

(57) ABSTRACT

A vehicle that includes in-vehicle controller(s) coupled to an external network transceiver, and configured to register a key fob and/or a mobile device configured as a key fob. The transceiver is configured to communicate autonomously with remote servers to respond to a key fob signal received from the server, which includes an authentication code and a remote control command generated by the key fob and/or mobile device configured as the key fob. In further variations, the key fob is also configured to be paired and/or registered by an external mobile device, by the authentication code, and to generate the remote control command via the mobile device. In response to the key fob signal, the controller(s) autonomously adjust vehicle systems, such as locking or unlocking, arming and disarming a security system, adjusting cabin and/or seat temperature and configuration preferences, as well as other driver vehicle preferences.

13 Claims, 2 Drawing Sheets

VEHICLE WITH EXTENDED RANGE REMOTE CONTROL KEY FOB

TECHNICAL FIELD

The disclosure relates to a vehicle that includes a paired or registered, key fob remote control capability that has a wireless signal range extended by autonomous, remote web-based server and mobile phone communications.

BACKGROUND

Vehicle manufacturers have developed various types of in-vehicle and/or on-board computer processing systems that include vehicle control, vehicle to vehicle and vehicle to infrastructure communications systems, and related messaging capabilities, and various other vehicle related applications. Additionally, such vehicle systems sometimes are further configured to enable remote control of various vehicle functions utilizing a securely paired mobile key fob. Such mobile key fobs have typically been configured as Bluetooth™ low energy (BLE) devices that must be within a predetermined range of a transceiver in the vehicle to enable operation.

While some advances have been made to extend the distance and/or range over which such BLE devices can generate, transmit, and receive messages to and from the vehicles, limitations persist that prevent consistent and uninterrupted BLE to vehicle remote control capabilities at extended ranges. Some attempts have been made to enable remote vehicle control utilizing other types of mobile devices, such as smart phones, which have extended range communications capabilities. However, each of such devices require user interaction between either the mobile device and/or the vehicle applications so facilitate remote control of the vehicle.

SUMMARY

Many types of personal, commercial, and industrial vehicles, including combustion engine and hybrid, plug-in hybrid, and battery electric vehicles, hereafter collectively referred to as "vehicles," include several types of in-vehicle computing systems, controllers, interfaces, networks, communications capabilities, and applications. Such onboard systems and applications enable vehicle operation, as well as vehicle to vehicle and vehicle to infrastructure communications, and related communications and remote control capabilities that utilize key fobs and other types of mobile devices via such contemplated communications systems.

The disclosure is directed to a vehicle that includes at least one and/or one or more in-vehicle and/or onboard controller(s) that is/are coupled to an external network transceiver. The controller(s) are configured to register and/or "pair" a key fob having an authentication code, to enable remote control of the vehicle by the key fob. The transceiver is configured to communicate autonomously with one or more remote server(s) in communication with an external network, such as the internet, and may be one or more transceivers each configured for particular communications protocols and capabilities, such as for example, WiFi and cellular communications.

The controller(s) is/are further configured to detect and respond to a key fob signal received from the remote server, which signal includes the authentication code and a remote control command generate by the key fob. In response to the key fob signal, the controller(s) are further arranged to modify operation of at least one component of the vehicle according to the remote control command. In further variations, the key fob is also configured to be paired and/or registered by an external mobile device, by the authentication code, and to generate the remote control command. In some adaptations, the mobile device may also be configured to communicate with the remote server(s). Further, the mobile device is configured to respond to the remote control command, and to autonomously communicate to the remote server, the authentication code and the remote control command.

In additional variations, the onboard controller is also configured to respond to the key fob signal from the remote server when the key fob is beyond a range of an onboard wireless vehicle transceiver that is configured with a communication signal range that is less than that of the external network transceiver. In response to detecting the key fob to be within a range of the onboard wireless vehicle transceiver, the controller(s) are also, in other arrangements, configured to discontinue communication with the remote server. The disclosure is also directed to modifications having the controller(s) configured to respond to not detecting the key fob, within the signal range of the onboard wireless vehicle transceiver, and to respond by communicating autonomously and periodically with the remote server by the external network transceiver, to monitor for and detect the remote control command from the key fob.

The disclosure includes further modified controller(s) that are configured to register the mobile device, and to respond to not detecting the key fob, while detecting the mobile device within a range of the onboard wireless vehicle transceiver. In this adaptation, the controller(s) are configured to communicate periodically and autonomously with the mobile device by the wireless transceiver to detect the remote control command from the key fob.

In each of such variations, the disclosure contemplates the controller(s) configured to monitor, detect, and respond to various remote control commands from the key fob, including for purposes of example but not for purposes of limitation, unlock, lock, engine start, cabin and/or seat temperature adjust, security system arm/disarm, security system arm/disarm, and driver preference commands, among others. The controller(s) are also adapted in other arrangements to register and/or pair with the mobile device and the authentication code, and to respond to key fob signals and remote control commands generated by the mobile device alone and independently from the key fob.

This summary of the implementations and configurations of the vehicles and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
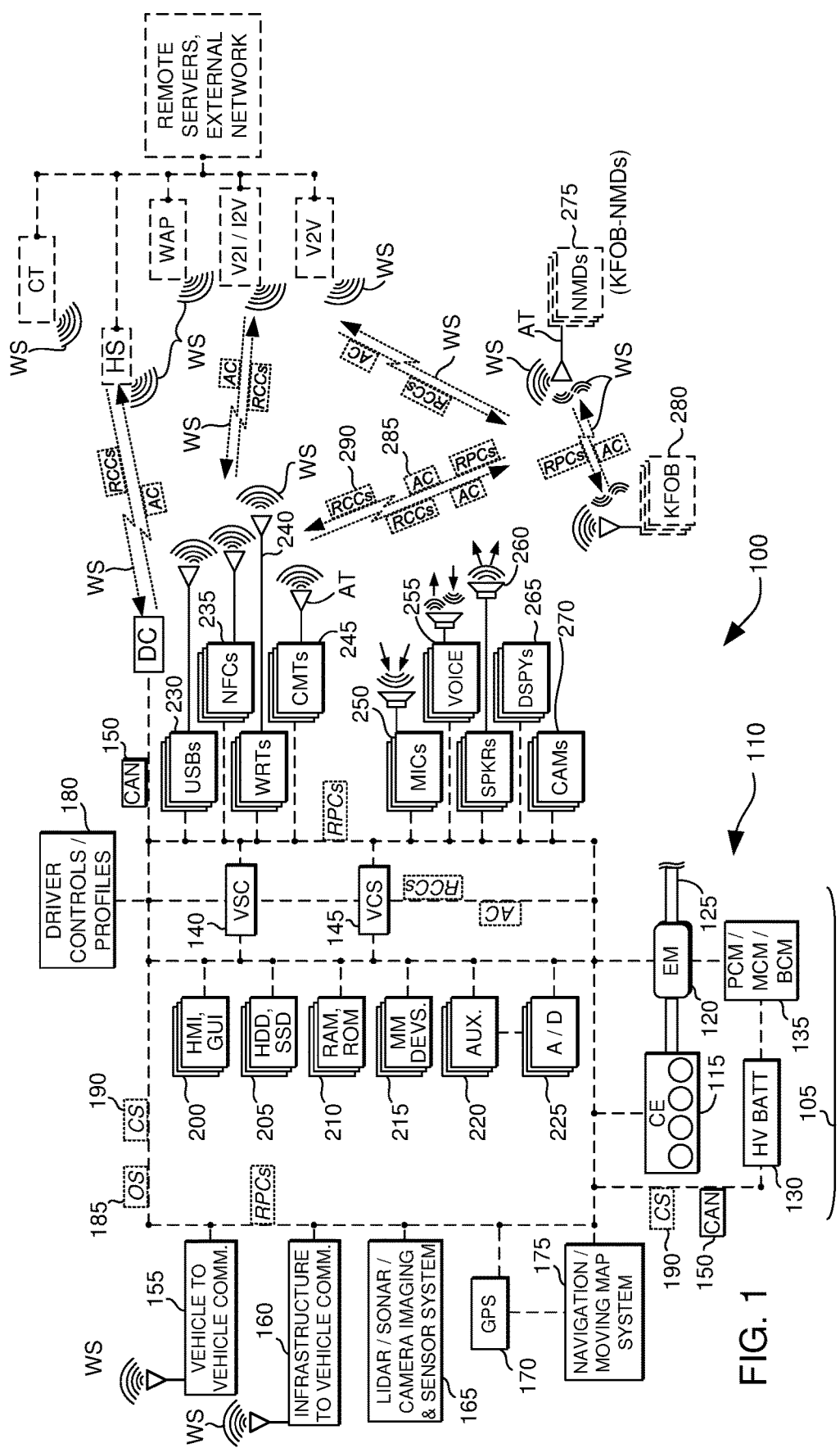
FIG. 1 is an illustration of a vehicle and its systems, controllers, components, sensors, actuators, and methods of operation.
Figure 2:
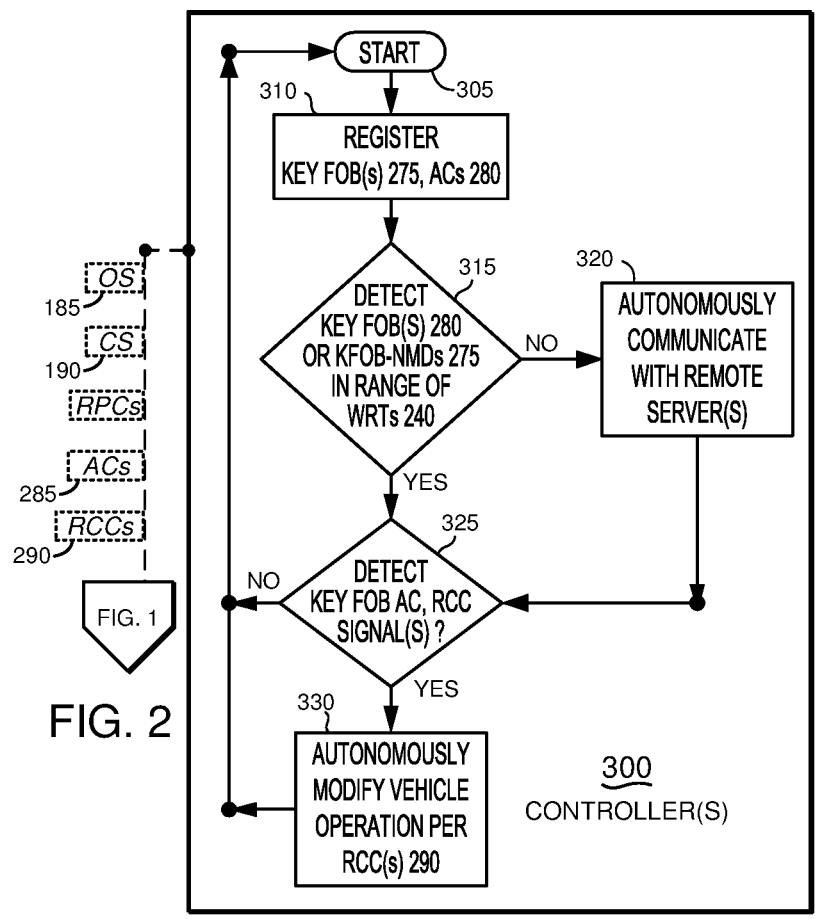
FIG. 2 illustrates certain aspects of the disclosure depicted in FIG. 1, with components added, removed, and/or rearranged for purposes of illustration.

With reference now to the various figures and illustrations and to FIGS. 1 and 2, and specifically to FIG. 1, a schematic diagram of a conventional petrochemical-powered and/or hybrid electric vehicle 100 is shown, which vehicles may in further examples also include a battery electric vehicle, a plug-in hybrid electric vehicle, and combinations and modifications thereof, which are herein collectively referred to as a "vehicle" or "vehicles." FIG. 1 illustrates representative relationships among components of vehicle 100. Physical placement and orientation, and functional and logical connections and interrelationships of the components within vehicle 100 may vary. Vehicle 100 includes a driveline 105 that has a powertrain 110, which includes one or more of a combustion engine (CE) 115 and an electric machine or electric motor/generator/starter (EM) 120, which generate power and torque to propel vehicle 100.

Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices. EM 120 may be any one of a plurality of types of electric machines, and for example may be a permanent magnet synchronous motor, electrical power generator, and engine starter 120. CE 115 and EM 120 are configured to propel vehicle 100 via a drive shaft 125 and in cooperation with various related components that may also further include a transmission, clutch(es), differentials, a braking system, wheels, and the like.

Powertrain 110 and/or driveline 105 further include one or more batteries 130. One or more such batteries can be a higher voltage, direct current battery or batteries 130 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 130 operating in the range of between about 6 and 24 volts or more or less, which is/are used to store and supply power for other vehicle components and accessories.

A battery or batteries 130, are respectively coupled to engine 115, EM 120, and vehicle 100, as depicted in FIG. 1, through various mechanical and electrical interfaces and vehicle controllers, as described elsewhere herein. High voltage EM battery 130 is also coupled to EM 120 by one or more of a power train control module (PCM), a motor control module (MCM), a battery control module (BCM), and/or power electronics 135, which are configured to convert and condition direct current (DC) power provided by high voltage (HV) battery 130 for EM 120.

PCM/MCM/BCM/power electronics 135 are also configured to condition, invert, and transform DC battery power into three phase alternating current (AC) as is typically required to power electric machine or EM 120. PCM/MCM/BCM 135/power electronics is also configured to charge one or more batteries 130, with energy generated by EM 120 and/or front end accessory drive components, and to receive, store, and supply power from and to other vehicle components as needed.

With continued reference to FIG. 1, vehicle 100 further includes one or more controllers and computing modules and systems, in addition to PCM/MCM/BCM/power electronics 135, which enable a variety of vehicle capabilities. For example, vehicle 100 may incorporate a body control module (BCM) that is a stand-alone unit and/or that may be incorporated as part of a vehicle system controller (VSC) 140 and a vehicle computing system (VCS) and controller 145, which are in communication with PCM/MCM/BCM 135, and other controllers.

For example, in some configurations for purposes of example but not limitation, VSC 140 and/or VCS 145 is and/or incorporates the SYNC™, APPLINK™, MyFord Touch™ and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices.

For further examples, but not for purposes of limitation, at least one of and/or one or more of the controller(s) such as VSC 140 and VCS 145, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a media player (MP3, Blu-Ray™, DVD, CD, cassette tape, etc.), stereo, FM/AM/satellite radio receiver, and the like, as well as a human machine interface (HMI) and/or display unit as described elsewhere herein.

Such contemplated components and systems are available from various sources, and are for purposes of example manufactured by and/or available from the SmartDeviceLink Consortium, the OpenXC project, the Ford Motor Company, and others (See, for example, SmartDeviceLink.com, openXCplatform.com, www.ford.com, U.S. Pat. Nos. 9,080,668, 9,042,824, 9,092,309, 9,141,583, 9,141,583, 9,680,934, and others).

In further examples, SmartLinkDevice (SDL), OpenXC, and SYNC™ AppLink™ are each examples that enable at least one of and/or one or more of the controller(s) such as VSC 140 and VCS 145, to communicate remote procedure calls (RPCs) utilizing application programming interfaces (APIs) that enable command and control of external or off-board mobile devices and applications, by utilizing in-vehicle or on-board HMIs, such as graphical user interfaces (GUIs) and other input and output devices, which also include the hardware and software controls, buttons, and/or switches, as well as steering wheel controls and buttons (SWCs), instrument cluster and panel hardware and software buttons and switches, among other controls. Exemplary systems such as SDL, OpenXC, and/or AppLink™ enable functionality of the mobile device to be available and enabled utilizing the HMI of vehicle 100 such as SWCs and GUIs, and also may include utilization of on-board or in-vehicle automated recognition and processing of voice commands.

Controller(s) of vehicle 100 such as VSC 140 and VCS 145, include and are coupled with one or more high speed, medium speed, and low speed vehicle networks, that include among others, a multiplexed, broadcast controller area network (CAN) 150, and a larger vehicle control system and other vehicle networks that may and/or may not require a host processor, controller, and/or server, and which may further include for additional examples, other micro-processor-based controllers as described elsewhere herein. CAN 150 may also include network controllers and routers, in addition to communications links between controllers, sensors, actuators, routers, in-vehicle systems and components, and off-board systems and components external to vehicle 100.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

CAN 150 contemplates the vehicle 100 having one, two, three, or more such networks running at varying low, medium, and high speeds that for example nay range from about 50 kilobits per second (Kbps) to about 500 Kbps or higher. CAN 150 may also include, incorporate, and/or be coupled to and in communication with internal, onboard and external wired and wireless personal area networks (PANs), local area networks (LANs), wide area networks (WANs), peer to peer (P2P), vehicle to vehicle (V2V), and vehicle to infrastructure, infrastructure to vehicle (V2I, I2V) networks, among others and as described and contemplated elsewhere herein.

In further examples without limitation, VSC 140, VCS 145, and/or other controllers, devices, and processors, may include, be coupled to, be configured with, and/or cooperate with one or more integrally included, embedded, and/or independently arranged bidirectional communications, navigation, and other systems, controllers, and/or sensors, such as a vehicle to vehicle communications system (V2V) 155, and vehicle to roadway infrastructure to vehicle communication system (V2I) 160, a LIDAR/SONAR (light and/or sound detection and ranging) and/or video camera roadway proximity imaging and obstacle sensor system 165, a GPS or global positioning system 170, and a navigation and moving map display and sensor system 175, among others.

VCS 145 can cooperate in parallel, in series, and distributively with VSC 140 and such steering wheel controls and buttons and other controllers, subsystems, and internal and external systems to manage and control vehicle 100, external devices, and such other controllers, and/or actuators, in response to sensor and communication signals, data, parameters, and other information identified, established by, communicated to, and received from these vehicle systems, controllers, and components, as well as other off-board systems that are external and/or remote to vehicle 100.

Such bidirectional V2V 155 and V2I 160 (sometimes also referred to herein collectively as V2X) communications controllers and systems enable peer to peer, vehicle to vehicle, and vehicle to infrastructure ad hoc and similar types of networks and communications, utilizing various industry protocols, standards, and/or messaging formats that available in the United States and other countries. Such protocols, standards, and/or messaging formats are utilized for purposes of enabling various aspects of the disclosure and are known to those having knowledge in the relevant technology.

A number of international standards organizations are also involved in the field of technology and have generated various V2X resources such as SAE telematics and related standards J2945 and J2735: "On-Board System Requirements for V2V Safety Communications Standard," SAE J2945/1_201603, standards.sae.org/j2945/1_201603/, and "Dedicated Short Range Communications (DSRC) Message Set Dictionary Standard," SAE J2735_201603, standards.sae.org/j2735_201603, and others available from topics.sae.org/telematics/standards/automotive.

The SAE J2735 standard describes, defines, and specifies messages and data elements that make up messages/dialogs specifically for use by vehicle, infrastructure, and other off-board applications that utilize 5.9 gigahertz (GHz) DSRC for Wireless Access in Vehicular Environments (WAVE) communications systems. Such WAVE communications and related systems are described in more detail in various reports established by and available from the Institute of Electrical and Electronics Engineers (IEEE) as described below. See, for example, standards.ieee.org, and more specifically, IEEE standard 1609, entitled, "Guide for Wireless Access in Vehicular Environments (WAVE) Architecture," which is available from standards.ieee.org/develop/wg/1609_WG.html.

The IEEE 1609 WAVE standards enable and define an architecture and a standardized set of communications services and interfaces that enable secure V2V and V2I wireless communications. These standards enable a range of transportation and navigation applications, including vehicle safety, automated tolling, enhanced navigation, and traffic management, among others. The IEEE 1609 Wave capabilities are utilized in conjunction with others directed to various aspects of network and communications standards and architectures, including those managed by the IEEE 802 local area network and metropolitan area network (LAN/MAN) standards committee, which can be found at www.ieee802.org, as well as standards.ieee.org.

IEEE Standards 802.11 support software and firmware communications services of IEEE 1609, and are enable data link media access control (MAC) and physical layer (PHY) capabilities, such as wireless local area network (WLAN) data communications in various frequency bands. The 802.11 standard is entitled "IEEE Standard for Information technology—Telecommunications and information exchange between systems—Local and metropolitan area networks—Specific requirements Part 11: Wireless LAN Medium Access Control (MAC) and Physical Layer (PHY) Specifications," and is available at ieeexplore.ieee.org/document/7792308.

While illustrated here for purposes of example, as discrete, individual controllers, PCM/MCM/BCM 135, VSC 140 and VCS 145, and the other contemplated controllers, subsystems, and systems, may control, be controlled by, communicate signals to and from, and exchange data with other controllers, and other sensors, actuators, signals, and components, which are part of the larger vehicle and control systems, external control systems, and internal and external networks, components, subsystems, and systems.

The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers, components, subsystems, and systems, both in the singular and plural connotations, and individually, collectively, and in various suitable cooperative and distributed combinations.

Further, communications over CAN 150 and other internal and external PANs, LANs, and/or WANs, are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, PCM/MCM/BCM 135, VSC 140, VCS 145, CAN 150, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off.

Computer-readable storage devices or media may be implemented using any of a number of known persistent and non-persistent memory devices such as PROMs (programmable read-only memory), EPROMs (electrically PROM), EEPROMs (electrically erasable PROM), hard disk drives (HDDs), solid state drives (SSDs), flash memory, or any other electric, magnetic, optical, or combination memory devices capable of storing and communicating data. Each of such devices, components, processors, microprocessors, controllers, microcontrollers, memories, storage devices, and/or media may also further contain, include, and/or be embedded with one or more basic input and output systems (BIOSs), operating systems, application programming interfaces (APIs) having, enabling, and/or implementing remote procedure call (RPCs), and related firmware, microcode, software, logic instructions, commands, and the like, which enable programming, customization, coding, and configuration, and which may be embedded and/or contained in at least one of and/or distributed across one or more such devices, among other capabilities.

In this arrangement, VSC 140 and VCS 145 cooperatively manage and control the vehicle components and other controllers, sensors, and actuators, including for example without limitation, PCM/MCM/BCM 135, and/or various others. For example, the controllers may establish bidirectional communications with such internal and external sources, and communicate control commands, logic, and instructions and code, data, information, and signals to and/or from engine 115, EM 120, batteries 130, and PCM/MCM/BCM/power electronics 135, and other internal and external components, devices, subsystems, and systems. The controllers also may control and communicate with other vehicle components known to those skilled in the art, even though not shown in the figures.

The embodiments of vehicle 100 in FIG. 1 also depict exemplary sensors and actuators in communication with wired and/or wireless vehicle networks and CAN 150 (PANs, LANs) that can bidirectionally transmit and receive data, commands, and/or signals to and from VSC 140, VCS 145, and other controllers. Such control commands, logic, and instructions and code, data, information, signals, settings, and parameters, including driver preferred settings and preferences, may be captured and stored in, and communicated from a repository of driver controls, preferences, and profiles 180, as well as memory and data storage of the other controller(s).

As described and illustrated in the various figures, including FIGS. 1 and 2, the signals and data, including for example, commands, information, settings, parameters, control logic and executable instructions, and other signals and data, can also include other signals (OS) 185, and control or command signals (CS) 190 received from and sent to and between controllers and vehicle components and systems, either over wired and/or wireless data and signaling connections. OS 185, and CS 190, and other signals, related control logic and executable instructions, parameters, and data can and/or may be predicted, generated, established, received, communicated, to, from, and between any of the vehicle controllers, sensors, actuators, components, and internal, external, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIG. 1 and other figures, and by schematically represented data communication lines and signals and wireless signals and data connections. Such diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

FIG. 1 also schematically depicts for continuing illustration purposes but not for purposes of limitation, an example configuration and block topology for VCS 145 for vehicle 100 and its contemplated controllers, devices, components, subsystems, and/or systems. The disclosure is directed to the HMIs including the hardware and software switches and controls (HSCs), which further refer to, incorporate, and include buttons, and/or switches, and steering wheel controls and buttons (SWCs), instrument cluster and panel hardware and software buttons and switches, and GUI display software switches and controls, among other controls In additional exemplary arrangements, the various controllers, such as for example VCS 145, include(s) and/or may include in some arrangements, at least one and/or one or more human machine interfaces (HMIs)/graphical user interface(s) and visual display(s) (GUIs, HMIs) 200 that may be located in a cabin of vehicle 100. HMIs/GUIs 200 may also be coupled and cooperate with automated speech recognition and speech synthesis subsystems, as well as with additional hardware and software controls, buttons, and/or switches, which are incorporated, included, and/or displayed on, about, and/or as part of HMI/GUI 200 and instrument clusters and panels of vehicle 100.

Such controls, buttons, and/or switches may be integrated with HMIs/GUIs 200, as well as with other vehicle devices and systems that may include, for further examples and illustrations, a steering wheel and related components, vehicle dashboard panels and instrument clusters, and the like. For added purposes of example without limitation, VCS 145 may include and/or incorporate persistent memory and/or storage HDDs, SSDs, ROMs 205, and non-persistent or persistent RAM/NVRAM/EPROM 210, and/or similarly configured persistent and non-persistent memory and storage components.

VCS 145 and/or other controller(s), in illustrative but non-limiting examples, also include, incorporate, and/or are coupled to one or more vehicle-based bidirectional data input, output, and/or communications and related devices and components, which enable communication with users, drivers, and occupants of vehicle 100, as well as with external proximate and remote devices, networks (CAN 150, PANs, LANs, WANs), and/or systems. The phrases "vehicle-based" and "onboard" refer to devices, subsystems, systems, and components integrated into, incorporated about, coupled to, and/or carried within vehicle 100 and its various controllers, subsystems, systems, devices, and/or components. In contrast, the phrase "offboard" is directed and contemplates such controllers, subsystems, systems, devices, and/or components being located external to and/or remote from vehicle 100.

For additional examples, VCS 145, GUIs 200, and other controllers of vehicle 100, may include, incorporate, be paired to, synchronized with, and/or be coupled with vehicle-based multimedia devices 215, auxiliary input(s) 220 and analog/digital (A/D) circuits 225, universal serial bus port(s) (USBs) 230, near field communication transceivers (NFCs) 235, wireless routers and/or transceivers (WRTs) 240, such as "Bluetooth™" and Bluetooth™ low energy (BLE) devices, that enable wireless personal and local area networks (WPANs, WLANs) or "WiFi" IEEE 802.11 and 803.11 communications standards, and/or analog and digital cellular network modems and transceivers (CMTs) 245 utilizing voice/audio and data encoding and technologies that include for example, those managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

Such contemplated onboard and offboard devices and components, among others, are configured to enable bidirectional wired and wireless communications between components and systems of vehicle 100, CAN 150, and other external devices and systems and PANs, LANs, and WANs. A/D circuit(s) 225 is/are configured to enable analog-to-digital and digital-to-analog signal conversions. Auxiliary inputs 220 and USBs 230, among other devices and components, may also enable in some configurations wired and wireless Ethernet, onboard diagnostic (OBD, OBD II), free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 220 and A/D circuits 225, USBs 230, NFCs 235, WRTs 240, and/or CMTs 245, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 150, VCS 145, and other controllers and networks of vehicle 100. Auxiliary inputs 220, A/D circuits 225, USBs 230, NFCs 235, WRTs 240, and/or CMTs 245, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices are contemplated to be integrated with, coupled to, and/or connectable to, auxiliary inputs 220, A/D circuits 225, USBs 230, NFCs 235, WRTs 240, and/or CMTs 245, as well as to the other contemplated controller(s) and wired and wireless networks internal to vehicle 100, and in some circumstances external to vehicle 100. For example, the one or more input and output devices include microphones 250, voice processing and recognition devices and subsystems 255, speaker(s) 260, additional display(s) 265, camera(s) 270, nomadic and mobile devices (NMDs) 275, and/or key fobs such as remote and/or keyless car starters and keyless entry devices 280, among others, which each include at least one and/or one or more integrated signaling and communications antennas and/or transceivers (AT).

Such input and output devices are and/or may be selectable, connectable, synchronized with, paired to, and/or actuatable with an input selector that may be any of HSCs, and may also include, incorporate, and/or be integrated with and/or as part of GUI 200 and the contemplated hardware and software SWCs, controls, buttons, and/or switches. Such HSCs, as already noted, may be hardware or software or combinations thereof and may be configurable utilizing one or more predetermined, default, and adjustable factory and/or driver controls, profiles, and/or preferences 180.

The contemplated microphones 250, voice processing and recognition devices and subsystems 255, speaker(s) 260, additional display(s) 265, camera(s) 270, NMDs 275, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC speakers and stereo devices and players, portable GPS and GNSS devices, and similar devices and components that each may include integrated transceivers and antennas AT, wired and plugged connectors DC, and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections (DCs) and wired and wireless signals and signaling and data communications and streams WS, with external near and far nomadic, portable, and/or mobile devices 275, networks, and systems (V2X) that may include, for example, roadway and infrastructure communications systems (V2I) such as hotspots and wireless access points (HS/WAPs), nano and micro and regular cellular access points and towers (CT), external routers (XRs), and related and accessible external and remote networks, systems, and servers.

With continuing reference to the various figures, including FIGS. 1, and 2, it may be understood by those with knowledge in the relevant fields of technology that the disclosure contemplates vehicle 100 to include at least one and/or one or more in-vehicle and/or onboard controller(s) such as VSC 140, VCS 145, and others coupled with an in-vehicle or on-board transceiver AT, such as those described in connection with USBs 230, and local, short-range transceivers such as NFCs 235, WRTs 240 (including the contemplated wireless WiFi and Bluetooth™ and Bluetooth™ low energy or BLE transceivers), and/or longer-range cellular transceivers such as CMTs 245. The controller(s) 140, 145 and transceiver(s) AT are configured to detect WSs and connect to nearby or proximate or far wired and wireless network devices having in-range WSs, as well as third-party, off-board, external devices such as nomadic, portable, and/or mobile or nomadic mobile devices 275, and one or more key fob(s) 280 (KFOB, FIG. 1).

Vehicle 100 also includes the various controller(s), by one or more of the local, shorter range transceivers, configured to securely register, be paired to, and/or coupled with at least one of such key fob(s) 280, by at least one and/or one or more electronic security token(s), authentication code(s) (ACs) 285, and/or similar such secure communications code(s), which enable recognition of such devices by the controller(s), and which enhance the security of communications between devices. Each manufacturer of the contemplated vehicles 100 typically include one or more pre-registered key fob(s) 280 with every such vehicle fabricated, and also incorporate various procedures for registering and/or pairing such key fob(s) 280 with the controller(s), systems, devices, and/or components of the vehicles 100. The controller(s) are further configured to communicate autonomously with a remote server over an external network (FIG. 1), by one or more of the longer range cellular transceivers, to monitor for and detect signals WS received from key fob(s) 280 via the remote server and external network, which signals include AC(s) 285, and remote control commands (RCCs) 290.

In response to key fob signals received from the remote server, which include AC(s) 285 and RCC(s) 290, the onboard controller(s) in other variations of vehicle 100 are configured to autonomously modify operation of at least one component of vehicle 100, according to the RCC(s) 290. The controller(s) of vehicle 100 according to the disclosure continuously monitor for, detect, and respond to such RCC(s) 290 and AC(s) 285 without user interaction, such that the autonomous capability is enabled. Such operation of the at least one component, components, and/or systems of vehicle 100, include for purposes of example without limitation, adjusting components and systems of vehicle 100 according to one or more driver preferences that may be stored in repository 180 and associated with key fob(s) 280, AC(s) 285, and/or RCC(s) 290. Such RCC(s) 290 include, for purposes of example without limitation, commands that at least one of lock or unlock a door or trunk of vehicle 100, start or power off engine 115 and/or EM 120, charge the battery(ies) 130, adjust a cabin temperature of vehicle 100, adjust passenger seat temperatures or positions, arm or disarm a security system, and adjust one or more other components, systems, and/or devices of vehicle 100, such as an infotainment system, according to driver preferences stored in repository 180, among others.

In other variations, the key fob(s) are registered and/or paired with and by a mobile device, such as NMDs 275, also by and utilizing the authentication code. The mobile device(s) 275 are also configured to monitor for, detect, and to autonomously respond to the registered and/or paired key fob 280, without any required user interaction with mobile devices 275. As a result, once such NMDs 275 have registered and been paired to the key fob 280, the mobile devices 275 autonomously respond to and communicate the AC(s) 285 and RCC(s) 290 to the remote server, without the need for or requiring a user to unlocking, interacting with, and/or responding in any way to the mobile devices 275 and/or key fob(s) 280.

In this way, such NMDs 275 autonomously extend the range of key fobs 280 beyond the nominal range of such devices, by utilizing the cellular, WiFi, and/or other communications capabilities of the mobile devices 275. For further example without limitation, many such key fobs 280 are BLE devices that utilize relatively low power transmitters designed for use over short distances, which communicate with transceivers of vehicle 100, such as Bluetooth™ configured WRTs 240, which in combination enable a radio communications distance in free air without obstructions of about between 1 to 30 meters, or so. Obstructions such as buildings, walls, vehicle doors, and the like can substantially reduce such distances. Consequently, the innovations of the disclosure that enable extension of a radio communication distance range of key fobs 280, by autonomously utilizing such mobile devices and NMDs 275 is a substantial advantage.

According to the disclosure, the controller(s) of vehicle 100 are configured to autonomously monitor, detect, and respond to such ACs 285 and RCCs 290, which may originate from the key fobs 280, via the NMDs 275, and remote server(s). In other examples and variations, the in-vehicle and/or onboard controller(s) of vehicle 100 are also configured to respond to the wireless signal WS of key fobs 280, from the remote server(s), when the key fob(s) 280 is/are beyond and/or outside a radio communication distance range of the onboard wireless vehicle transceivers. When the controller(s) of vehicle 100 do not detect key fob(s) 280 in range of the vehicle wireless transceivers WRTs 240, the controller(s) in some arrangements of the disclosure are further configured to communicate autonomously and periodically with the remote server by the cellular external network transceiver(s) CMTs 245, to detect one or more of the AC(s) 285 and RCC(s) 290 from the key fob(s) 280.

Such in-vehicle wireless transceivers include for example without limitation WRTs 240 or others, which are typically configured as Bluetooth™ and/or WiFi devices, and which are configured for vehicle area or personal area networks (VANs, PANs) with a communication signal range distance that can range only as high as about 100 meters or so without obstructions. Such wireless vehicle transceivers WRTs 240 have radio communication ranges substantially less than the cellular external network transceivers of vehicle 100, such as for example, CMTs 245, which typically have far greater radio communication distance ranges of more than 5 kilometers and as high as 35 kilometers or more.

In contrast, the onboard controller(s) are also further configured in other modifications to respond to detecting registered and/or paired key fobs 280 within a radio communication distance range of the onboard wireless vehicle transceiver(s) WRTs 240, and to discontinue communication with the remote server, such that communications are enabled directly between the key fobs 280 and vehicle 100. Additional configurations include the onboard controller(s) configured to, in response to not detecting the key fob(s) 280, but instead detecting the mobile devices or NMDs 275, within a radio communication distance range of onboard wireless vehicle transceiver(s) WRTs 240, to communicate periodically and autonomously with the mobile device(s) 275, by the wireless transceivers WRTs 240, to detect one or more of the AC(s) 285 and/or RCC(s) 290 from the key fob(s) 280.

The disclosure also contemplates the controller(s) of vehicle configured to respond to the mobile devices or NMDs 275 being configured as independent and/or stand-alone KFOB-NMDs 275, and to generate the key fob signals WS, which include the AC(s) 285 and/or RCC(s) 290. In this arrangement, the disclosure is directed to the KFOB-NMDs 275 being paired with and/or registering the key fobs 280 to receive and store both, the AC(s) 285, and the various possible RCC(s) 290 that are enabled by the original equipment key fobs 280. Further, such KFOB-mobile-devices 275 can then be utilized independent of key fobs 275, to generate and/or communicate AC(s) 285 and/or RCC(s) 290 from communication to remote server(s) and/or directly to the transceiver(s) WRTs 240 of vehicle 100. As with other adaptations, the controller(s) of vehicle 100 also monitor for, detect, and respond to the either of the key fobs 280 and/or the NMDs-as-key fobs or KFOB-NMDs 275, being in range and out of range of the vehicle transceivers WRTs 240, and to switch between monitoring for key fob signals WS directly from key fobs 280, NMDs 275, KFOB-NMDs 275, and/or remote server(s).

Each of the variations, arrangements, and modifications of the disclosure further include methods of operation as may be further understood with continuing reference to FIG. 1, as well as also now to FIG. 2. Such methods include, for purposes of further example but not limitation, methods of controlling vehicle 100, utilizing the described controller(s), transceiver(s), and related components, devices and systems, which are here generally also referred to collectively and/or in combination as controller(s) 300 (FIG. 2). Starting at step 305, the methods also include at step 310, registering key fob(s) 280 by AC(s) 285, with one or more of controller(s) 300 of vehicle 100, and/or NMDs 275.

The methods for controlling vehicle 100 also include, by the in-vehicle controller(s) 300, at step 315, autonomously detecting whether NMDs 275 configured as key fobs 280, and/or key fobs 280, are within the radio communication distance range of the wireless transceiver(s) WRTs 240 of vehicle 100. If key fobs 280 and/or NMDs-as-key-fobs 275 (KFOB-NMDs, FIG. 2) are not detected within the ranger, then at step 320, the methods of the controller(s) 300 of vehicle 100 include communicating autonomously and periodically with the remote server(s) by the cellular external network transceiver(s) CMTs 245, to monitor for and detect signals from such KFOB-NMDs 275 and/or key fobs 280.

At step 325 of the contemplated methods of controller(s) 300 and vehicle 100, included is monitoring for and detecting key fob signal(s) WS received from the remote server(s), and further detecting whether the signals WS include one or more and/or at least one of AC(s) 285 and/or RCCs 290. If not, the methods return control to the start step 305. Otherwise, the methods of the controller(s) 300 further include at step 330, autonomously modifying operation of at least one component of vehicle 100, according to the RCC(s) 290. Which as with other configurations described elsewhere herein, includes for example without limitation, modifying operations with commands for at least one of unlocking and locking the door or trunk, starting or powering off engine 115 or EM 120, charging one or more of battery(ies) 130, adjusting the cabin temperature, adjust passenger seat temperatures or positions, arming or disarming the security system, and adjusting other components, systems, and/or devices of vehicle 100, such an infotainment system, according to driver preferences stored in repository 180, among others.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a controller onboard a vehicle coupled to an external network transceiver, and configured to:
register a key fob with the vehicle using an authentication code, and
communicate autonomously with a remote server, and
in response to a key fob signal received from a mobile device via the remote server, the signal including the authentication code and a remote control command, autonomously modify operation of at least one component of the vehicle according to the remote control command,
wherein the mobile device is configured to
register with the key fob using the authentication code, and
responsive to receiving the remote control command from the key fob, send the authentication code and the remote control command to the vehicle via the remote server as a key fob signal.

2. The vehicle according to claim 1, wherein the onboard controller is further configured to respond to the key fob signal from the remote server when the key fob is beyond a range of an onboard wireless vehicle transceiver configured with a communication signal range less than the external network transceiver.

3. The vehicle according to claim 1, wherein the onboard controller is further configured to:
in response to detecting the key fob within a range of an onboard wireless vehicle transceiver configured with a communication signal range less than the external network transceiver,
discontinue communication with the remote server.

4. The vehicle according to claim 1, wherein the onboard controller is further configured to:
in response to not detecting the key fob within a range of an onboard wireless vehicle transceiver configured with a communication signal range less than the external network transceiver,
communicate autonomously and periodically with the remote server by the external network transceiver to detect the remote control command from the key fob.

5. The vehicle according to claim 1, wherein the onboard controller is further configured to register a mobile device, and is further configured to:
in response to not detecting the key fob and detecting the mobile device within a range of an onboard wireless vehicle transceiver configured with a communication signal range less than the external network transceiver, communicate periodically and autonomously with the mobile device by the wireless transceiver to detect the remote control command from the key fob.

6. The vehicle according to claim 1, wherein the remote control command includes at least one of an unlock, lock, engine start, cabin temperature adjust, security system arm or disarm, and driver preference command.

7. The vehicle according to claim 1, wherein:
the onboard controller is further configured to register a mobile device with the authentication code; and
the mobile device is configured as the key fob and to generate the key fob signal to include the remote control command.

8. The vehicle according to claim 7, wherein the onboard controller is further configured to:
in response to not detecting the mobile device as the key fob within a range of an onboard wireless vehicle transceiver configured with a communication signal range less than the external network transceiver,
communicate periodically and autonomously with the remote server by the external network transceiver to detect the remote control command from the mobile device as the key fob.

9. The vehicle according to claim 7, comprising:
the remote control command includes at least one of an unlock, lock, engine start, cabin temperature adjust, security system arm or disarm, and driver preference command.

10. A method of controlling a vehicle, comprising:
by an onboard controller coupled to an external network transceiver:
registering a key fob by an authentication code,
communicating autonomously with a remote server by the external network transceiver, and
in response to a key fob signal received from the remote server sent by a mobile device that includes the authentication code and a remote control command, autonomously modifying operation of at least one component of the vehicle according to the remote control command,
wherein the mobile device is configured to
register with the key fob using the authentication code, and
responsive to receiving the remote control command from the key fob, send the authentication code and the remote control command to the vehicle via the remote server as a key fob signal.

11. The method according to claim 10, further comprising:
the onboard controller registering the mobile device, and by the onboard controller,
in response to not detecting the key fob and detecting the mobile device within a range of an onboard wireless transceiver coupled to the onboard controller,
communicating autonomously and periodically with the mobile device by the onboard wireless transceiver to detect the remote control command from the key fob.

12. The method according to claim 10, comprising:
the onboard controller registering the mobile device with the authentication code; and
the mobile device operating as the key fob and generating the key fob signal to include the remote control command.

13. The method according to claim 12, further comprising:
by the onboard controller,
in response to not detecting the mobile device as the key fob within a range of an onboard wireless transceiver coupled to the onboard controller, communicate autonomously and periodically with the remote server by the external network transceiver to detect the remote control command from the mobile device as the key fob.

* * * * *